ABSTRACT

United States Patent [19]

Biondetti

[11] 4,222,324
[45] Sep. 16, 1980

[54] APPARATUS FOR DETERMINING THE PRESSURE FORCES EFFECTIVE IN A ROLLING MILL HAVING AT LEAST ONE CONTROLLED DEFLECTION ROLL AND AT LEAST ONE COUNTER ROLL

[75] Inventor: Mario Biondetti, Schio, Italy

[73] Assignee: Escher Wyss Aktiengesellschaft, Zurich, Switzerland

[21] Appl. No.: 34,499

[22] Filed: Apr. 30, 1979

[30] Foreign Application Priority Data

May 22, 1978 [CH] Switzerland ............... 5545/78

[51] Int. Cl.³ .................... B30B 15/14; B30B 3/04
[52] U.S. Cl. .................... 100/47; 29/113 AD; 29/116 AD; 100/162 B; 100/170
[58] Field of Search ............ 100/47, 162 B, 170; 29/113 AD, 116 AD; 72/20, 243

[56] References Cited

U.S. PATENT DOCUMENTS

| | | | |
|---|---|---|---|
| 3,921,514 | 11/1975 | Biondetti | 100/170 |
| 4,023,840 | 5/1977 | Biondetti | 100/47 |
| 4,074,624 | 2/1978 | Biornstad | 100/170 |
| 4,106,405 | 8/1978 | Biondetti | 100/170 |
| 4,106,405 | 8/1978 | Biondetti | 100/162 B |
| 4,154,160 | 5/1979 | Küsters | 100/47 |

Primary Examiner—Edward J. McCarthy
Attorney, Agent, or Firm—Werner W. Kleeman

[57] ABSTRACT

An apparatus for determining the pressure forces effective in a rolling mill having at least one controlled deflection roll and at least one counter roll, there being provided beams for simulating the stiffness or rigidity of the counter roll and the shell of the controlled deflection roll. These are further provided pressure elements which simulate the effect of the hydrostatic pressure or support elements of the controlled deflection roll, and measuring elements serve to measure the pressure between the beams. External pressure elements can serve to simulate the effect of external contact or pressure cylinders. With a rolling mill having a number of controlled deflection rolls and a number of solid counter rolls, the beams, the pressure elements and the measuring elements can be appropriately grouped or assembled together. The measuring elements deliver signals which can be employed for controlling or regulating a corresponding rolling mill which is simulated.

7 Claims, 6 Drawing Figures

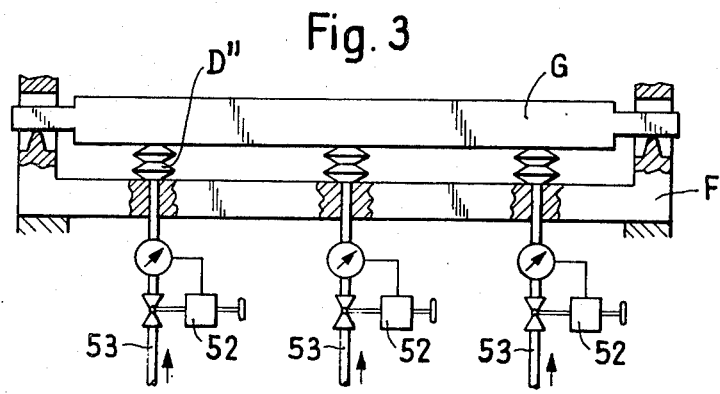
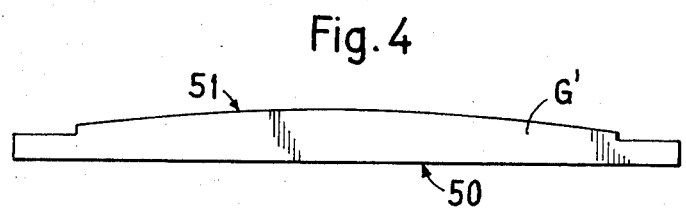
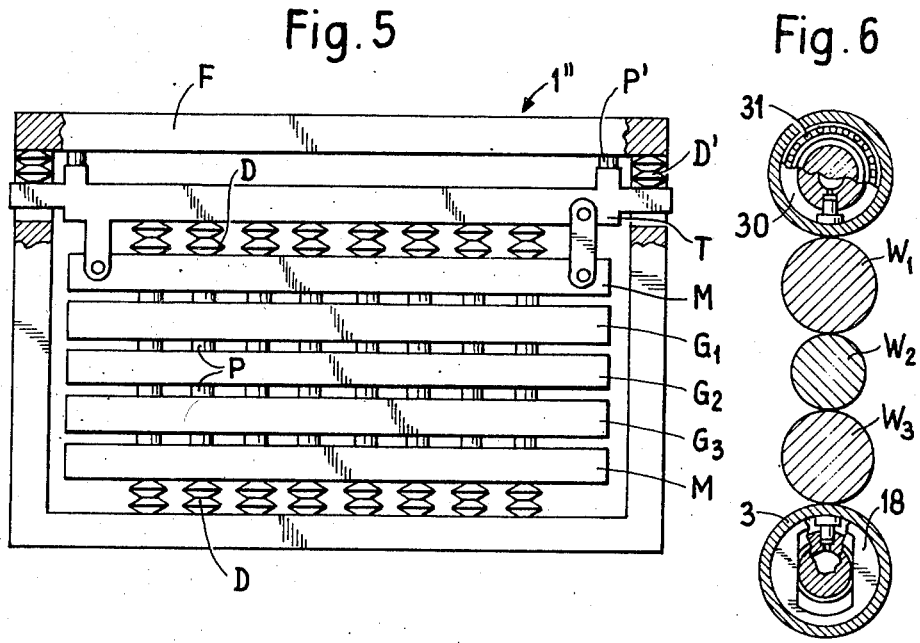

APPARATUS FOR DETERMINING THE PRESSURE FORCES EFFECTIVE IN A ROLLING MILL HAVING AT LEAST ONE CONTROLLED DEFLECTION ROLL AND AT LEAST ONE COUNTER ROLL

BACKGROUND OF THE INVENTION

The present invention relates to a new and improved construction of apparatus for the determination of the pressure forces which are effective in a rolling mill provided with at least one controlled deflection roll and at least one counter roll. Each such controlled deflection roll may be of the type comprising a stationary roll support or core and a roll shell rotatable about such stationary roll support. Between the stationary roll support and the rotatable roll shell there are arranged hydrostatic pressure or support elements which can be actuated individually or in groups, as desired.

Now in U.S. Pat. No. 4,023,480, granted May 17, 1977, there is disclosed a control apparatus, by means of which it is possible at a rolling mill having a controlled deflection roll and a counter roll, to determine and maintain an equilibrium condition between the internal forces effective at the controlled deflection roll and the forces of an external pressure mechanism. However, this equipment is only suitable for use with one particular type of rolls, namely those where the roll shell of the controlled deflection roll is rotatably mounted upon the support or core. Furthermore, such state-of-the-art equipment does not allow for an actual determination of the rolling forces which are effective between the rolls, since such is additionally influenced by the rigidity or stiffness of the roll shell and the counter roll.

SUMMARY OF THE INVENTION

Therefore, with the foregoing in mind, it is a primary object of the present invention to provide a new and improved construction of apparatus of the previously mentioned type which is suitable, in the form of a simulator, for the determination of the forces which are effective between the rolls of the rolling mill, and at the same time also is suitable for use as a measuring device of a control or regulator for the regulation of such forces to certain desired values.

Yet a further significant object of the present invention aims at providing apparatus for reliably determining the pressure forces effective in a rolling mill having at least one controlled deflection roll and at least one counter roll, which apparatus is relatively simple in construction and design, quite economical to manufacture, highly reliable in operation, not readily subject to breakdown or malfunction, and requires a minimum of maintenance and servicing.

Now in order to implement these and still further objects of the invention, the apparatus of the present development, by means of which it is possible to obtain such objectives, is generally manifested by the features that there is provided an elastic shell beam which, as to its form and its rigidity or stiffness, corresponds to a certain degree to the course and the magnitude of the stiffness of the roll shell of the controlled deflection roll. Further, there is provided a counter beam which, as to its form and its stiffness, corresponds to the same degree to the course and the magnitude of the flexural strength or stiffness of the counter roll. Pressure elements act upon the shell beam corresponding to the roll shell, and the position of such pressure elements corresponds to the position of the pressure or support elements of the controlled deflection roll or groups of such pressure elements. These pressure elements acting upon the shell beam, corresponding to the roll shell, are capable of exerting forces which essentially correspond to the forces exerted by the pressure elements of the controlled deflection roll. Additionally, there are provided pressure measuring elements located between both of the beams, these pressure measuring elements being suitable for forming measuring signals corresponding to the forces acting thereat.

With the apparatus of the invention it is possible to simulate the forces which are effective in the rolling mill or rolling device, and equally, the stiffness or rigidity of the components exposed to such forces. Based upon the measuring values delivered by the pressure measuring elements it is possible to reliably make predictions or draw conclusions concerning the magnitude of the pressure forces which are effective, in the rolling mill, between the rolls.

In the case of controlled deflection roll having a roll shell which is freely located in the pressure plane in relation to the roll support, the pressure elements can be supported in a frame or frame arrangement of the equipment. The roll support of the controlled deflection roll, in this case, likewise is fixedly supported in the frame arrangement of the rolling mill.

In the case of a controlled deflection roll having a roll shell, the ends of which are rotatably mounted at the roll support, there being arranged external pressure elements at the ends of the roll support which serve for pressing the controlled deflection roll against the counter roll, the shell beam corresponding to the roll shell, has operatively associated therewith a parallel support beam whose ends are pivotably mounted at the shell beam. The ends of this parallel support beam are connected with the shell beam at the locations which correspond to the bearings, and the pressure elements are located between the support beam and the shell beam. Between a frame of the equipment and the support beam there are further arranged external pressure elements or pressure means which, as to their position and dimensions, correspond to the external pressure elements of the controlled deflection roll, and each such type pressure element has operatively associated therewith an external pressure measuring element serving for measuring the force which is effective between the support beam and the frame at the region of the further arranged related pressure element or means.

In this case, by means of the support beam there is simulated the roll support of the controlled deflection roll, which is not directly supported at the frame of the rolling mill, rather is pressed, by means of the external pressure elements, for instance hydraulic cylinders, against the counter roll.

There can be provided counter pressure elements which act upon the counter beam corresponding to the counter roll, and specifically in opposite direction to the pressure elements corresponding to the controlled deflection roll. In this way there can be simulated the effect of arching or crowning of the counter roll.

However, it is also possible to take into account the arching of one of the coacting rolls in that at the simulator device, the beam, which corresponds to the arched or crowned roll, possesses an arching or domed configuration.

Preferably, at least part of the pressure measuring elements located between the beams can be connected with a regulator or control. The regulator or control delivers an output signal which serves for adjusting the pressure force of the related pressure element of the equipment, and, at the same time, serves for adjusting the pressure force of the corresponding pressure or support element of the controlled deflection roll.

In this way, the simulator devices becomes part of a regulation or control system for regulating the rolling mill in such a manner that the pressure forces effective between the rolls attain a desired value and this value is also maintained.

In the case of a controlled deflection roll having a roll shell, the ends of which are rotatably mounted at the roll support, at the simulator device the outputs of both external pressure measuring elements, located between the support beam and the frame of the equipment, are each connected with a regulator. The regulator delivers an output signal which serves for adjusting the pressure force of the related external pressure element located between the support beam and the frame as well as the related external pressure or contact element of the roll.

During operation, the forces are controlled such that the pressure measuring elements measure a force equal to null. This namely means that the forces of the external pressure or contact elements of the controlled deflection roll are in equilibrium with their inner forces of the pressure or support elements of the controlled deflection roll. However, it should be understood that by virtue of the regulation it is also possible to set desired non-equilibrium conditions between the forces. If, for instance, the forces of the hydrostatic pressure or support elements in total are larger than the forces of the external pressure elements, then there is obtained, as a result, a bending-through of the roll shell in the direction of the counter roll, something which may be completely desirable.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a section of the arrangement of FIG. 1 or that of FIG. 2, illustrating the counter pressure elements for simulating the effect of arching of the counter roll;

FIG. 4 illustrates a domed or arched beam for taking into account the arching or crowning of one of the intercoacting rolls;

FIG. 5 is a schematic illustration of inventive apparatus for simulating a rolling mill or device having two controlled deflection rolls and three solid rolls; and FIG. 6 is a schematic sectional illustration of the rolling mill arrangement shown in FIG. 5.

DETAILED DESCRIPTION OF THE PREFERRED EMBODIMENTS

Figure 1:
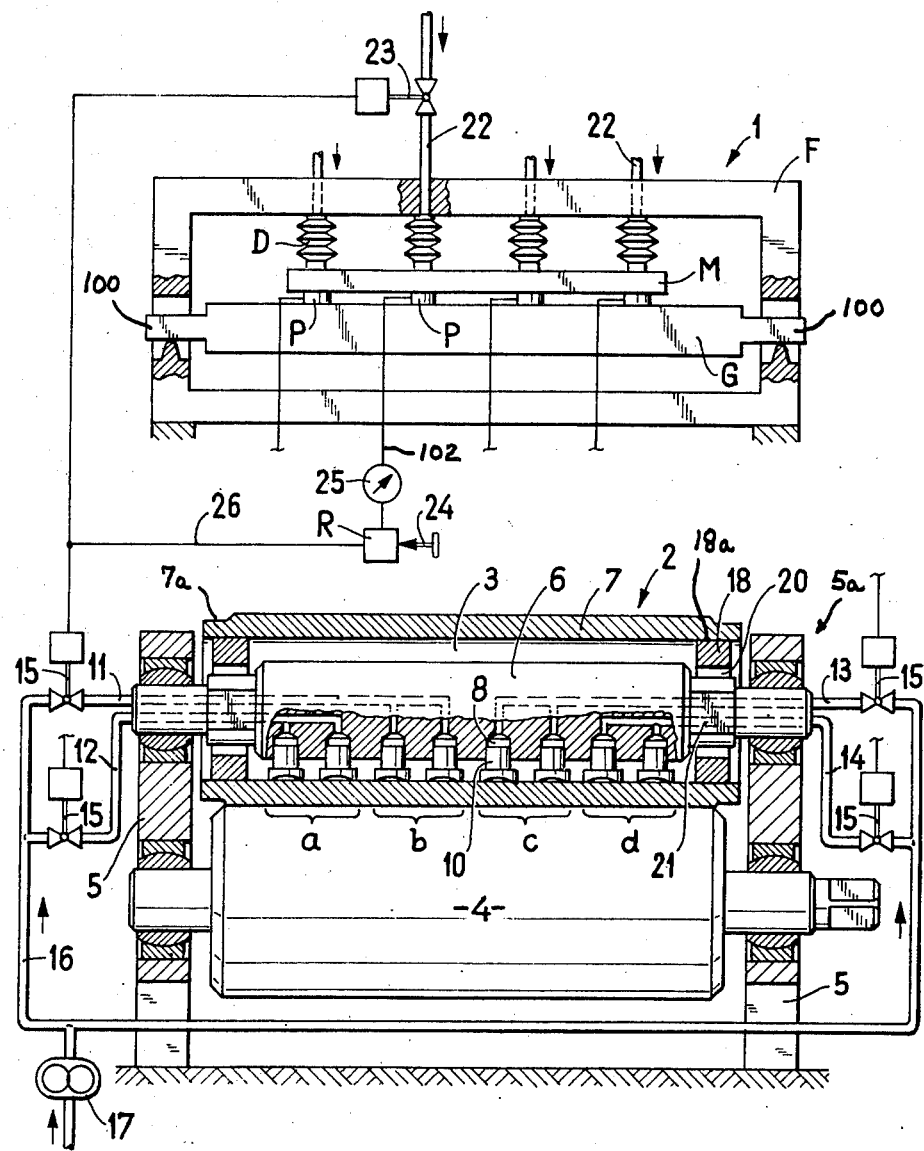
FIG. 1 is a schematic illustration of a first exemplary embodiment of inventive apparatus together with the related rolling mill or device and the control or regulation circuit operatively interconnecting the same.

Describing now the drawings, in FIG. 1 there is illustrated an inventive simulation or simulator device 1 as well as a rolling mill or device 2 having a controlled deflection roll 3. Coacting with the controlled deflection roll 3 is a counter roll 4. The rolls 3 and 4 are mounted in a frame or frame arrangement, generally indicated by reference character 5a, having the side elements 5. The controlled deflection roll 3, which possesses a roll support or core 6 and a roll shell 7 rotatable about the support 6, may be constructed essentially as disclosed in the commonly assigned U.S. Pat. No. 3,802,044, granted Apr. 9, 1974 and U.S. Pat. No. 3,885,283, granted May 27, 1975, to which reference may be readily had, and the disclosure of which is incorporated herein by reference.

More specifically, according to the aforementioned U.S. Pat. No. 3,802,044 there are provided in the roll support or core 6 a number of bores or chambers 8 receiving the hydrostatic pressure or support elements 10. These bores 8 are flow connected with hydraulic lines or conduits 11, 12, 13 and 14 in which there can be regulated the pressure of any suitable pressurized fluid medium, by means of the hydraulic pressure regulating valves 15. The lines 11, 12, 13 and 14 are connected with a common feed or delivery line 16 leading to a pump 17 or equivalent structure.

As also best seen by referring to FIG. 1, the pressure elements 10 are subdivided into four groups, a, b, c and d. As a matter of convenience and simplicity in illustration, each such group has been shown as constituting two pressure elements 10, but in reality contains a larger number of such pressure elements. The group a is supplied by the line 12, the group b by the line 11, the group c by the line 13 and the group d by the line 14. By the same token, and as previously mentioned, it is also possible to construct the controlled deflection roll so that the pressure elements 10 are individually controlled, should such mode of operation be desired.

As taught in the aforementioned U.S. Pat. No. 3,885,283, and ends 7a of the roll shell 7 are rotatably mounted upon outer surfaces 18a of guides 18. These guides or guide means 18 have elongate openings 20 possessing parallel side surfaces guided along parallel side surfaces 21 of the roll support 6. By means of the guides 18 the roll shell 7 is movably guided, in relation to the roll support 6, in the direction of the counter roll 4 and away therefrom.

For reasons of simplifying the illustration with the controlled deflection roll 3 shown in FIG. 1, there have been conveniently omitted the standard closures or end covers located at the ends 7a of the roll shell 7 and which prevent outward escape of the hydraulic fluid medium, typically hydraulic oil, out of the roll shell 7. Also omitted from the drawings are the bores and the parts connected therewith, which serve for the outflow of the oil out of the roll shell 7. Finally, the controlled deflection roll 3 can additionally be equipped with upwardly directed pressure elements serving for lifting the roll shell 7 from the counter roll 4. Since all of these parts are well known in this art, they have not been shown in the drawings to simplify the illustration, as mentioned.

As apparent from the upper part of the showing of FIG. 1, the simulation device 1 contains a frame or frame means F in which there is pivotably supported a counter beam G at its ends 100. Extending essentially parallel to the counter beam G is a so-called shell beam M. Between the counter beam G and the shell beam M there are arranged the pressure measuring elements P which, for instance, can comprise conventional pressure pickups or transducers formed of quartz. The shell beam M is exposed to the action of pressure elements D to which there is infed, by means of the lines or conduits 22, a pressurized fluid medium, for instance, compressed air, the pressure of which can be determined by pressure regulating valves 23, wherein in FIG. 1 there has only been shown one such pressure regulating valve 23 as a matter of convenience in illustration. For the same reasons there has only been shown the connection of one of the pressure measuring elements P at a regulator or control R, the reference or set value 24 of which can be adjusted for instance manually. In the signal line or conductor 102 of the related pressure measuring element P there can be connected a suitable indicator or display device 25. An output line or conductor 26 leads from the regulator R both to the associated regulating valve 23 of the simulator device 1 and equally to the related regulating valve 15 of the rolling mill 2.

As already mentioned, the form and the stiffness or rigidity of the shell beam M and the counter beam G are accommodated in a certain degree to the course and the magnitude of the stiffness or rigidity of the roll shell 7 and the counter roll 4. In the same manner, the pressure forces of the pressure elements D correspond, again in a given degree, to the pressure forces of the related groups a, b, c or d of the pressure elements 10 of the controlled deflection roll 3. Hence, the measuring signals of the pressure measuring elements P constitute a reproduction or image of the pressure forces effective at the relevant locations between the rolls 3 and 4. The regulators R thereafter serve to influence the hydraulic forces of the pressure elements 10 of the controlled deflection roll 3, so that such forces attain the desired value as determined by the reference value 24.

It should be understood that not only each of the groups a, b, c and d can contain a larger number of pressure elements 10, but that also there can be provided more or less than the illustrated four groups of such pressure elements. The controlled deflection roll 3 can also be provided with a single group of pressure elements 10, i.e. all of the elements of the controlled deflection roll operate at the same pressure. In the same manner also each of the groups a, b, c and d can have operatively associated therewith more than one pressure element D.

Figure 2:
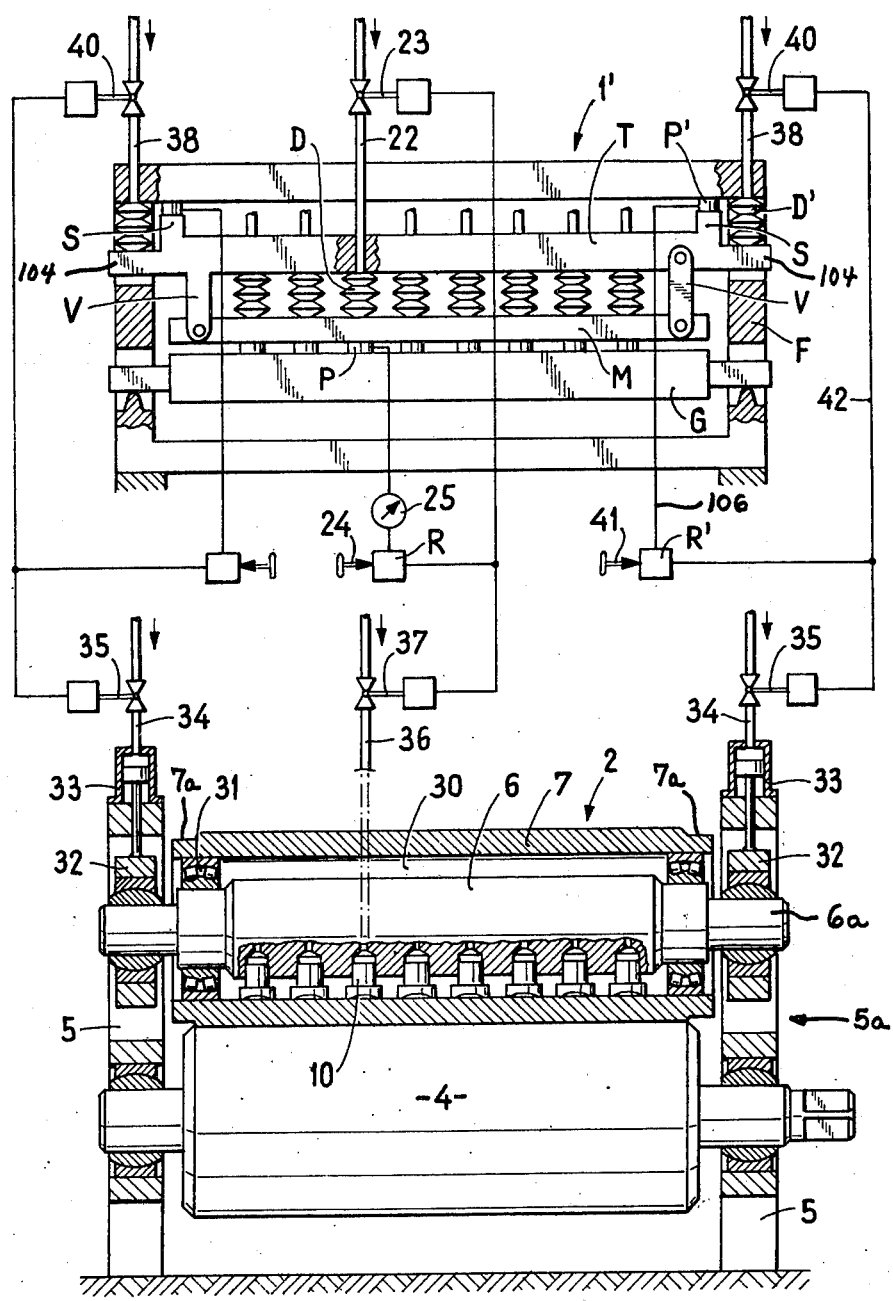
FIG. 2 is a schematic illustration, corresponding to the showing of FIG. 1, of a second embodiment of the invention.

Now with the embodiment of FIG. 2 there have been generally employed the same reference characters as used in the description of the embodiment of FIG. 1 in order to denote the same structure or elements. Here, the controlled deflection roll 30 of the rolling mill or device 2 of FIG. 2 differs from the controlled deflection roll 3 of the arrangement of FIG. 1 only in that the guide means or guides 18 are missing and replaced by bearings 31, by means of which the ends 7a of the roll shell 7 can be directly rotatably mounted upon the roll support or core 6. Since with such type of controlled deflection roll 30, as the same is known from the aforementioned U.S. Pat. No. 3,802,044, the roll shell 7 is not movable in relation to the roll support 6, an external pressure or contact mechanism must be provided in order to form the requisite pressure or contact movements and the lift-off movements. For this purpose, the ends 6a of the roll support 6 are mounted in slides or carriages 32 or equivalent structure, these slides 32 being movable up and down in the side elements 5 of the frame arrangement or frame means 5a. The slides or carriages 32 are exposed to the action of the pressure or contact cylinders 33 or equivalent structure. With the aid of the pressure cylinders 33 it is possible to press the entire controlled deflection roll 30 against the counter roll 4. The pressure cylinders 33 are connected with hydraulic pressure lines or conduits 34, in which there are arranged the pressure regulating valves 35. Additionally, and in contrast to the embodiment of FIG. 1, here all of the hydraulic pressure elements 10 of the controlled deflection roll 30 are individually connected at pressure lines or conduits 36 equipped with pressure regulating valves 37.

With the simulator device 1' shown in FIG. 2 there is provided in the frame F, in addition to the shell beam M and the counter beam G, a support beam T. This support beam T only serves to support the pressure elements D, and therefore, can have a random, but in any case sufficient rigidity or stiffness. At the locations which correspond in desired degree to the bearings 31, the support beam T and the shell beam M are hingedly interconnected by connection elements V. Additionally, the support beam T is provided at the region of its ends 104 with projections S confronting the frame 7. Between the projections S and the frame F there are arranged external pressure measuring elements P'. These external pressure measuring elements P' can be constructed the same as the pressure measuring elements P and serve to measure the forces which are effective between the frame F and the support beam T. Additionally, between the support beam T and the frame F there are arranged external pressure elements D' which correspond to the external pressure or contact elements of the controlled deflection roll 30, i.e., to the pressure cylinders 33. The external pressure elements D' are connected with pressure lines or conduits 38 which are supplied from the same source as the lines 22. The pressure of the pressure elements D', and thus, their pressure force, is influenced by the pressure regulating valves 40. The external pressure measuring elements P' are connected by means of the signal lines 106 with the related regulators or controls R', to which there is infed the reference value or set signals 41. The output signals of the regulators R' are infed, on the one hand, by means of the output lines 42 to the regulating valves 40, which determine the pressure of the external pressure elements D', and, on the other hand, are delivered to the pressure regulating valves 35 which, in turn, control the pressure of the hydraulic pressurized fluid medium in the cylinders 33.

During operation, the regulators or controls R operate, in the embodiment of FIG. 2, in the same manner as in the arrangement of FIG. 1, and in this way determine the pressure force which is effective between the rolls 30 and 4.

The additional regulators or controls R', provided for the embodiment of FIG. 2, are normally operated such that the measuring value of the external pressure elements P' amounts to null. In this case their reference value signal 41 likewise is equal to null. In one such case the pressure or contact forces of the external pressure elements P' and the inner pressure elements D are in equilibrium, and this is equally so for the corresponding forces of the pressure or support elements 10 and the pressure or contact elements 33. In this state the bearings 31 are load relieved and do not influence the bending-through of the roll shell 7. However, there are also possible operating states where the forces acting at the bearings 31 are desired in order to achieve a suitable deformation of the roll shell 7. This is accomplished by appropriate adjustment of the reference values 41 of the regulators or controls R'.

There are instances where either the controlled deflection roll 3 or 30 or the counter roll 4 should have an arching or doming. Such type arching, in the simplest case, can be realized by appropriately arching or doming one of the beams G or M, preferably the counter beam G. Such type arched counter beam G' has been illustrated in FIG. 4. Such counter beam G', apart from possessing a flat surface 50, has a domed or arched surface 51 having a crown or arch which corresponds in suitable relation to the arching of the related roll.

Corresponding to the illustration of FIG. 4, constituting a section of the arrangement of FIG. 1 or FIG. 2, it is however possible to obtain such type arching also by the application of further forces, by means of which the counter beam G is additionally loaded. Consequently, in the rest state there can be obtained a deformation of the counter beam G which corresponds to the doming or arching of the arched roll.

Corresponding to the illustration of FIG. 3 there are provided for this purpose, at the underside of the counter beam G, pressure elements D" arranged between such counter beam G and the frame F. These pressure elements D" are connected by means of the pressure regulating valves 52 and the pressure lines or conduits 53. The pressure lines 53 can be supplied from the same source as the lines or conduits 22 and 38.

Finally, in FIG. 5 there is shown an inventive simulation or simulator device 1" for use with a rolling mill having five rolls which have been schematically shown in sectional view in FIG. 6. In particular, this rolling mill or device will be seen to contain an upper roll 30 having the bearings 31, this roll 30 corresponding to the controlled deflection roll 30 of the arrangement of FIG. 2, there further being provided a lower roll 3 having a guide or guide means 18, this roll 3 corresponding to the controlled deflection roll 3 of the arrangement of FIG. 1. Between the controlled deflection rolls 3 and 30 there are located three solid intermediate rolls $W_1$, $W_2$ and $W_3$. In the simulator device 1", according to the showing of FIG. 5, the rolls $W_1$, $W_2$ and $W_3$ correspond to the counter beams $G_1$, $G_2$ and $G_3$, respectively. Between the shell beam M and the counter beams $G_1$, $G_2$ and $G_3$ there are arranged the illustrated pressure measuring elements P, but as a general rule there are however only employed one row of such elements and used for regulation purposes, for instance, those which are disposed between the counter beams $G_1$ and $G_2$ or the counter beams $G_2$ and $G_3$.

While there are shown and described present preferred embodiments of the invention, it is to be distinctly understood that the invention is not limited thereto, but may be otherwise variously embodied and practiced within the scope of the following claims. Accordingly,

What I claim is:

1. An apparatus for determining the pressure forces effective in a rolling mill equipped with at least one controlled deflection roll and at least one coacting counter roll, wherein said controlled deflection roll comprises a roll support, a roll shell rotatable about said roll support, and actuatable hydrostatic support elements located between said roll support and said rotatable roll shell, comprising:
   an elastic shell beam having a form and stiffness which essentially corresponds in a predetermined degree to the course and the magnitude of the stiffness of the roll shell of the controlled deflection roll;
   a counter beam having a form and stiffness which essentially corresponds in a predetermined degree to the course and the magnitude of the stiffness of the counter roll;
   pressure elements acting upon the shell beam which corresponds to the roll shell;
   said pressure elements of said shell beam having a position substantially corresponding to the position of at least predetermined ones of said hydrostatic support elements of said controlled deflection roll and effective for exerting forces at the shell beam which correspond to the forces exerted by the hydrostatic support elements of the controlled deflection roll;
   pressure measuring elements arranged between both of said beams; and
   said pressure measuring elements serving for producing measuring signals which essentially correspond to the forces acting at said pressure measuring elements.

2. The apparatus as defined in claim 1, wherein:
   the roll shell of the controlled deflection roll is freely movable in a pressure plane in relation to the roll support; and
   frame means at which there are supported said pressure elements acting upon said shell beam.

3. The apparatus as defined in claim 1, wherein:
   said controlled deflection roll has bearing means for rotatably mounting its roll shell at its ends upon said roll support;
   external pressure elements arranged at the ends of the roll support;
   said external pressure elements serving to press the controlled deflection roll against the counter roll;
   a support beam arranged substantially parallel to said shell beam;
   said parallel support beam having ends connected with said shell beam at locations which essentially correspond to the location of said bearing means of said controlled deflection roll;
   said pressure elements acting upon said shell beam being arranged between said support beam and said shell beam;
   frame means;
   external pressure means arranged between said frame means and said support beam;
   said external pressure means having a position and dimension essentially corresponding to the external pressure elements of said controlled deflection roll;
   an external pressure measuring element operatively associated with each said external pressure means arranged between said frame means and said support beam;
   each said external pressure measuring element serving to measure the force which is effective between the support beam and the frame means at the region of the related external pressure means.

4. The apparatus as defined in claim 1, further including:
   counter pressure elements effective at said counter beam corresponding to said counter roll, in a direction opposite to the effective direction of the pressure elements acting upon the shell beam; and
   said counter pressure elements serving for simulating the effect of arching of the counter roll.

5. The apparatus as defined in claim 1, wherein:

one of said beams has an arched configuration in order to take into account arching of one of said coacting rolls; and said arched configuration corresponding to the arched roll.

6. The apparatus as defined in claim 3, further including:

regulator means at which there are connected to at least part of the pressure measuring elements arranged between the beams;

said regulator means delivering an output signal for adjusting the pressure force of a related one of the pressure elements and at the same time for adjusting the pressure force of said corresponding hydrostatic support element of the controlled deflection roll.

7. The apparatus as defined in claim 6, further including:

frame means;

a respective one of said regulator means;

said external pressure measuring elements being located between the support beam and said frame means and having output means connected with a respective one of the regulator means;

said regulator means delivering output signals for adjusting the pressure force of the related external pressure means located between said support beam and said frame means and the related external pressure elements of the controlled deflection roll.

* * * * *